Patented Jan. 2, 1945

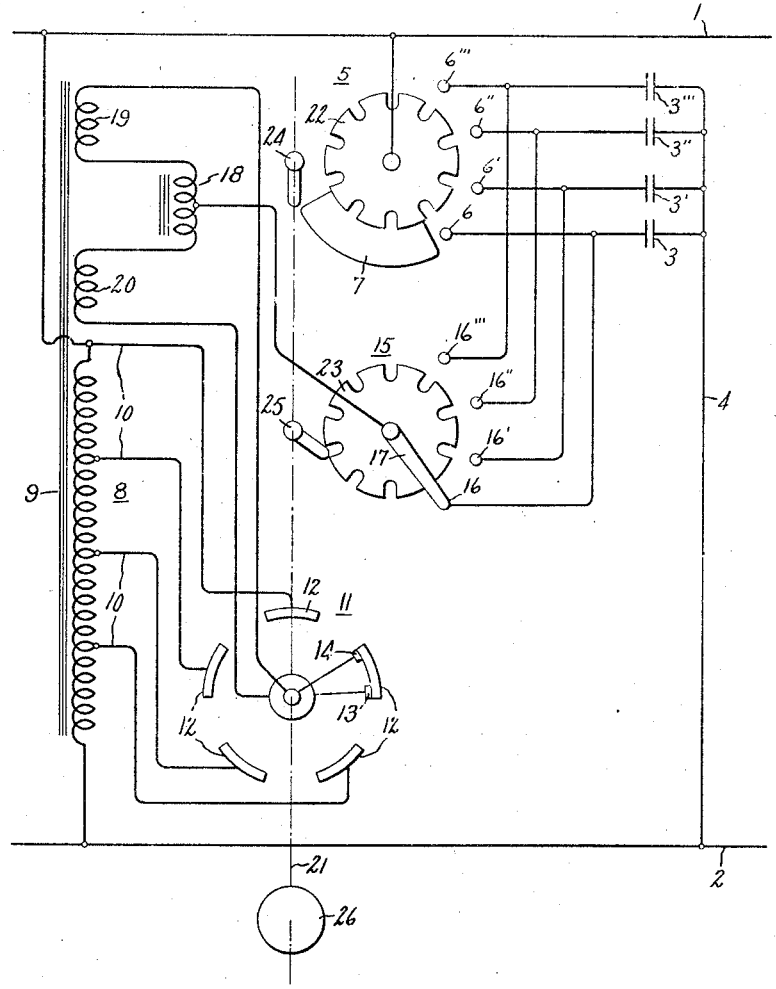

2,366,678

UNITED STATES PATENT OFFICE 2,366,678

ELECTRIC CONTROL SYSTEM

Zoltan O. St. Palley, Pittsfield, Mass., assignor to General Electric Company, a corporation of New York Application January 8, 1943, Serial No. 471,680

8 Claims. (Cl. 172—246)

This invention relates to electric control systems and more particularly to an improved control system for relatively smoothly connecting and disconnecting in sequence a plurality of electric devices to and from an electric circuit.

By "relatively smoothly" is meant that the volt-ampere loading of the circuit varies in much smaller steps than the normal volt-amperes of the devices themselves as they are sequentially connected to and disconnected from the circuit.

The invention is characterized by a voltage controller which is used over and over again to bring the voltage of each incoming device gradually up to the voltage of the circuit before it is fully connected thereto and for breaking the voltage of each outgoing device gradually down to zero before it is finally disconnected therefrom. This is accomplished by means of suitable switching means which is interlocked with the voltage controller.

The invention is particularly useful for the reactive volt-ampere control of alternating-current power circuits. Thus, if the electric devices are reactors, either capacitive or inductive or both, and they are effectively connected across the circuit, the reactive volt-ampere loading of the circuit may be varied relatively smoothly and in practically a linear manner over a wide range. In this manner the power factor, or voltage, or both of the circuit may be controlled or regulated. The invention is not limited to any particular kind of device, nor is it limited to manual operation, and any well-known means may be employed to operate it automatically in response to any suitable quantity or condition.

An object of the invention is to provide a new and improved electric control system.

Another object of the invention is to provide a new and improved combination of switching means and a variable voltage controller.

A further object of the invention is to provide a new and improved system for varying the volt-ampere, and particularly the reactive volt-ampere, loading of an alternating current power circuit.

The invention will be better understood from the following description taken in connection with the accompanying drawing and its scope will be pointed out in the appended claims.

Referring now to the single figure of the accompanying drawing, there is illustrated diagrammatically therein an embodiment of the invention which is associated with an alternating-current power circuit having conductors 1 and 2. These may either be the conductors of a single-phase circuit or they may be two of the conductors of a polyphase circuit, one of which is the neutral conductor in case of a star connection or both of which may be line conductors in the case of a mesh connection. A plurality of electric devices which are shown by way of example as capacitors 3, 3', 3" and 3'" and which are to be sequentially connected to and disconnected from the circuit, each have one terminal permanently connected to the main circuit conductor 2 by way of a conductor 4. The connections between the devices 3 and the main circuit are controlled by a primary switching means 5 shown by way of example as a single switch having a plurality of fixed contacts 6, 6', 6" and 6'" connected to the respective free terminals of the capacitors 3 and having a wide movable contact 7 which when rotated counterclockwise from the position shown will sequentially engage the fixed contacts so that the capacitor 3 will be connected in succession across the main circuit until finally all of them are connected in parallel across this circuit.

For bringing the voltage of each device 3 up to the voltage of the circuit before it is connected thereacross by the switch 5 and for reducing the voltage of each device 3 substantially to zero before it is finally and fully disconnected from the circuit there is provided a voltage controller shown by way of example as a tap-changing autotransformer 8, although it should be understood that any other variable ratio transformer could equally well be employed. However, an autotransformer is a very simple and inexpensive device in that it can consist merely of a single winding. The autotransformer itself is shown at 9 and it is provided with a plurality of taps 10 which are connected respectively to the contacts of a ratio adjusting mechanism or switch 11. This mechanism may be of any suitable type and is preferably of the load-ratio-control type, that is to say, it is of the type which changes connections from tap to tap without breaking the load circuit through the transformer. As shown by way of example, it comprises a plurality of fixed contacts 12 equally spaced on a circle to which successive contact is made by a pair of movable contacts 13 and 14 which are pivotally mounted at the center of the circle. These contacts are insulated from each other and the space between them is less than the width of any of the fixed contacts while the over-all arc covered by both movable contacts is greater than the angular distance between adjacent fixed contacts. In this manner at least one of the movable contacts is always making contact with at least one of the fixed contacts so that the circuit through the transformer is never interrupted by the switch 11. It will be observed, however, that there is one more fixed contact 12 than there are taps in the autotransformer 9. The extra fixed contact could, if desired, be connected to the line 2 of the main circuit or to the terminal of the autotransformer 9 which is directly connected thereto, but as this represents a zero voltage tap with respect to the capacitors 3, such connection is unnecessary. The extra fixed contact 12 corresponds, however, to the zero voltage position of the ratio adjusting mechanism.

For selectively connecting the capacitors 3 to the voltage controller 8 there is provided a secondary switching means 15 shown by way of example as a single dial switch having fixed contacts 16, 16′, 16″ and 16‴ connected respectively to the correspondingly primed fixed contacts 6 of the primary switch 5. This dial switch also has a movable contact 17 which is connected to the movable contacts 13 and 14 of the ratio adjusting mechanism 11 through a mid-tapped reactor 18, the purpose of which is to prevent short circuiting of portions of the winding 9 between adjacent taps when the movable contacts 13 and 14 make contact respectively with adjacent fixed contacts 12 of the ratio adjusting switch 11.

If desired, so-called double tickler coils 19 and 20 may be connected respectively between the terminals of the reactor 18 and the movable contacts 13 and 14. Such double tickler coils are described and claimed in Carson Reissue Patent 21,854 which is assigned to the assignee of the present application and their purpose is to equalize the inductive volt-ampere loading of the reactor 18 for all positions of the ratio adjusting switch 11. Each tickler winding has induced in it a voltage equal to one-fourth of the voltage between adjacent taps of the main winding 9 by any suitable means. For example, they may be mounted in inductive relation to the main winding 9.

In order to facilitate proper operation of the various elements of the system they are all interlocked by a common driving means consisting, for example, of a main shaft 21 to which the contacts 13 and 14 are directly fastened. However, the movable contacts 7 and 17 are rigidly fastened to respective Geneva gears 22 and 23 which are driven respectively by Geneva gear drivers 24 and 25 fastened to the shaft 21. The shaft 21 may be rotated by any suitable means such as by a hand wheel 26.

The operation of the illustrated embodiment of the invention is as follows: The system is shown in what may be called its minimum or zero reactive kva. position in that none of the capacitors 3 is connected across the main circuit and in that the ratio adjuster is in its zero voltage position. Assume now that the hand wheel 26 is rotated clockwise, as viewed in the drawing, so as to cause clockwise rotation of the contacts 13 and 14 as well as clockwise rotation of the Geneva gear drivers 24 and 25 which consequently at the proper times will cause step by step counterclockwise motion of the movable contacts 7 and 17 of the switching means 5 and 15. It will be observed that the Geneva gear driver 25 has just brought the movable contact 17 into contact with fixed contact 16 whereby the free terminal of the capacitor 3 is connected to the movable contacts of the ratio adjuster switch 11 through the secondary switching means 15. As the movable contacts 13 and 14 make successive contact with the fixed contacts 12, the capacitor 3 will be connected successively across more and more of the autotransformer 9, thereby increasing the voltage of the capacitor in a step by step manner. As the input to the transformer 9 is supplied from the main circuit and as the output of the transformers is connected across the capacitor 3, it is obvious that the capacitive kva. loading of the main circuit will increase step by step. After the movable contacts 13 and 14 reach the maximum voltage tap contact 12 the voltage of the capacitor 3 will be the same as the voltage of the main circuit. Further clockwise rotation of the shaft 21 will cause the Geneva gear driver 24 to move the contact 7 into engagement with the contact 6 thereby directly connecting the capacitor 3 across the main circuit. After the movable contacts 13 and 14 again make contact with the zero voltage tap of the ratio adjusting switch the Geneva gear driver 25 causes the movable contact 17 of the secondary switch 15 to move from fixed contact 16 to fixed contact 16′ thereby connecting the capacitor 3′ to the ratio adjusting switch 11 so that continued clockwise rotation of the hand wheel 26 will progressively raise the voltage of the capacitor 3′ until when it reaches the voltage of the main circuit the primary switching means 5 will connect it directly across the main circuit, and shortly thereafter the secondary switching means 15 will connect the capacitor 3″ to the ratio adjusting switch. In this manner the voltage of the capacitors is in turn brought up from the zero to the voltage of the main circuit and thereafter the capacitors are successively connected across the main circuit.

Operation of the hand wheel 26 in the opposite direction will reverse the procedure whereby the switch 5 will successively transfer the capacitors from across the main circuit to across the output of the autotransformer 9 through the ratio adjusting switch 11 and the secondary switch 15 and the voltage of each such transfer capacitor will then be gradually reduced to zero before the transfer of the next capacitor.

As previously mentioned, it is not necessary that all of the devices 3 be of the same kind. Thus, for example, some of them could be reactors instead of capacitors, in which case the control system could readily be made to progressively connect the capacitors across the circuit if the hand wheel 26 is rotated in one direction from a given neutral position and could progressively connect the reactors across the circuit if it is rotated in the opposite direction from the neutral position, it being understood, of course, that reversals of the directions of rotation of the hand wheel would reverse this procedure and cause successive disconnection of the device in the manner described above.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating current power circuit, a multi-tapped autotransformer winding connected across said circuit, a plurality of reactive elements each having a terminal effectively connected to one side of said circuit, a tap changer switching mechanism, driving means for making said mechanism cyclically traverse the tap range of said autotransformer, switching means interlocked with said driving means for successively connecting the opposite terminals of said elements to said tap changer, and additional switching means interlocked with said driving means for transferring said opposite terminals of said elements to the other side of said circuit when the tap changer has brought their voltages up to the voltage of said circuit.

2. In combination, an alternating current power circuit, a plurality of reactive elements for supplying wattless kva. to said circuit, a voltage regulator, means for operating said regulator so as to produce an output voltage cycle which varies between substantially zero and substantially the voltage of said circuit, means for connecting a different reactive element across said output voltage each time it is substantially zero, and means for successively transferring each such connected element from across said output voltage to across said power circuit when said output voltage is substantially equal to the voltage of said circuit.

3. In combination, an alternating current power circuit, a plurality of reactive elements, a single voltage control device, switching means for successively connecting said elements across said circuit and successively disconnecting them therefrom, and means for interlocking said switching means and voltage control device so that said control device brings the voltage of each reactive element in turn from substantially zero to the voltage of said circuit before said switching means connects it across said circuit and from the voltage of said circuit substantially to zero before said switching means disconnects it from said circuit.

4. In combination, a voltage regulator device having a pair of substantially constant voltage input terminals and a pair of variable voltage output terminals, reversible regulator driving means for varying the voltage of said output terminals between zero and the voltage of said input terminals in a cyclic manner, a plurality of electric devices, and multiple circuit controlling means interlocked with said regulator driving means for sequentially effectively connecting said device across said input terminals, said effective connections being preceded by disconnection of said device from across said input terminals and followed by the open circuiting thereof when the regulator is driven in one direction, said effective connections being followed by a transfer of said device to said input terminal when the regulator is driven in the opposite direction.

5. In combination, a variable voltage regulator device having a pair of substantially constant voltage input terminals and a pair of variable voltage output terminals, reversible regulator driving means for varying the voltage difference of said output terminals between zero and the voltage difference of said input terminals in a cyclic manner which is characterized by a relatively gradual increase and a relatively abrupt decrease for one direction of operation and a relatively gradual decrease and a relatively abrupt increase for the opposite direction of operation, a plurality of electric devices, and multiple circuit controlling means interlocked with said regulator driving means for sequentially effectively connecting said devices across said input terminals, said effective connections being preceded by disconnection of said devices from across said input terminals and followed by the open circuiting thereof when the regulator is driven in such direction that its output voltage is decreased gradually, said effective connections being followed by a transfer of said devices to said input terminals when the regulator is driven in the opposite direction.

6. In combination, an alternating current circuit, a plurality of reactive devices, primary switching means for connecting devices in turn across said circuit until all are so connected and for disconnecting said devices in turn from said circuit until all are so disconnected, a variable ratio transformer connected to be excited from across said circuit, secondary switching means for connecting each of said devices individually to be energized by said transformer before said primary switching means connects it across said circuit and after said primary switching means disconnects it from said circuit, and common driving means for the ratio varying means of said transformer and for both said switching means for causing the voltage of each device to be varied from zero to the voltage of said circuit before it is connected thereacross and for lowering its voltage to zero before it is disconnected from said transformer.

7. In combination, an electric circuit, a plurality of electric devices for sequential loading on and unloading from said circuit, means for sequentially connecting said devices, to said circuit, and means for loading selectively each one of said devices on said circuit as a progressively increasing load preparatory to the connecting of said device to said circuit by said first-mentioned means.

8. In combination, an electric circuit, a plurality of static load devices for said circuit, a single variable voltage ratio transforming device having input terminals connected across said circuit and having output terminals for selective connection across said load devices, means for successively changing the connections of said load devices between one extreme condition in which they are directly connected across said circuit and a second extreme condition in which they are open circuited by way of an intermediate condition by which they are individually connected across said output terminals, and means for operating said transforming device so as to vary the voltage of its output terminals between the voltage of said circuit and zero each time a load device is connected across its output terminals.

ZOLTAN O. ST. PALLEY.